United States Patent [19]
Åström et al.

[11] Patent Number: 6,108,559
[45] Date of Patent: Aug. 22, 2000

[54] SYSTEM AND METHOD FOR ROUTING MESSAGES IN RADIOCOMMUNICATION SYSTEMS

[75] Inventors: Bo Arne Valdemar Åström, Tulling; Roland Stig Bodin, Spånga, both of Sweden

[73] Assignee: Telefonaktiebolaget LM Ericsson, Stockholm, Sweden

[21] Appl. No.: 08/779,642

[22] Filed: Jan. 15, 1997

Related U.S. Application Data

[63] Continuation-in-part of application No. 08/141,085, Oct. 26, 1993.

[51] Int. Cl.⁷ .................................................. H04Q 7/32
[52] U.S. Cl. ............................................ 455/466; 455/550
[58] Field of Search ............................... 455/412, 414, 455/433, 434, 435, 466, 445, 550, 38.1, 514; 370/328, 337, 347, 349, 410, 310; 340/825.44

[56] References Cited

U.S. PATENT DOCUMENTS

| | | | |
|---|---|---|---|
| 4,221,933 | 9/1980 | Cornell et al. | 179/6 |
| 4,644,351 | 2/1987 | Zabarsky et al. | 340/825.44 |
| 4,700,374 | 10/1987 | Bini | 379/60 |

(List continued on next page.)

FOREIGN PATENT DOCUMENTS

| | | |
|---|---|---|
| 526764 | 2/1993 | European Pat. Off. . |
| WO90/06039 | 5/1990 | WIPO . |
| WO91/03137 | 3/1991 | WIPO . |
| WO91/03900 | 3/1991 | WIPO . |
| WO93/26131 | 12/1993 | WIPO . |
| WO95/12292 | 5/1995 | WIPO . |

OTHER PUBLICATIONS

Heintz et al., Translation of "*The Short Message Service—a New Service of Digital Mobile Communication*", (Sep. 1993).

GSM Recommendation 03.40, "*Technical Realization of the Short Message Service—Point to Point*", ETSI (Feb. 1992).

EITIA Interim Standard, "*Cellular Radio–Telecommunication Intersystem Operations: Automatic Roaming*", (Dec. 1991).

Michel Mouley et al., "*The GSM System for Mobile Communications*", pp. 556–565 (1992).

PCT International Search Report, Date of Mailing: Feb. 3, 1995.

Abstract for "*Voice Mail System for Portable Radio*", Application No. 62–203098.

GSM 09.02—Version 2 Draft Printed Jun., 1992, pp. 627–664.

GSM 09.02—Version 4.2.0 Draft, pp. 274–306.

Edward Beddoes et al., "*Cellular Radio Telephony—The Racal/VODAFONE Network in Great Britain*", Ericsson Review, No. 3 (1987).

*Primary Examiner*—William G. Trost
*Assistant Examiner*—Jean A. Gelin
*Attorney, Agent, or Firm*—Burns, Doane, Swecker & Mathis, L.L.P.

[57] ABSTRACT

A method and system for improving the routing of messages in a radio communication system are disclosed. In an exemplary system, messages which originate at a mobile unit are routed through both a service center associated with the originating mobile and a service center associated with a recipient mobile. If the recipient has subscribed to an enhanced message routing service, then the home location register returns an address of the recipient's service center in response to a request for routing information. When the home location register is queried again for routing information for the same message, the enhanced message service indicator is suppressed so that the home location register returns a routing number for the equipment which is currently supporting radiocommunication with the recipient, rather than returning the service center address a second time.

27 Claims, 4 Drawing Sheets

U.S. PATENT DOCUMENTS

| | | | |
|---|---|---|---|
| 4,790,003 | 12/1988 | Kepley et al. | 379/88 |
| 4,811,381 | 3/1989 | Woo et al. | 379/67 |
| 4,853,952 | 8/1989 | Jachmann et al. | 379/88 |
| 4,893,328 | 1/1990 | Peacock | 379/67 |
| 4,930,153 | 5/1990 | Hagedorn | 379/233 |
| 5,153,902 | 10/1992 | Buhl et al. | 379/60 |
| 5,278,890 | 1/1994 | Beeson, Jr. et al. | 379/58 |
| 5,282,240 | 1/1994 | Buhl et al. | 379/59 |
| 5,351,235 | 9/1994 | Lahtinen | 455/560 |
| 5,577,102 | 11/1996 | Koivunen | 455/433 |
| 5,610,972 | 3/1997 | Emery et al. | 455/414 |
| 5,628,051 | 5/1997 | Salin | 455/466 |
| 5,682,600 | 10/1997 | Salin | 455/466 |
| 5,682,601 | 10/1997 | Sasuta | 455/422 |
| 5,687,216 | 11/1997 | Svensson | 455/466 |
| 5,787,357 | 7/1998 | Salin | 455/433 |
| 5,930,239 | 7/1999 | Turcotte | 455/466 |
| 6,040,784 | 3/2000 | Miller | 455/38.1 |

SYSTEM AND METHOD FOR ROUTING MESSAGES IN RADIOCOMMUNICATION SYSTEMS

RELATED APPLICATION

This application is a continuation-in-part of U.S. patent application Ser. No. 08/141,085, entitled "A System and Method for Routing Messages in Radiocommunication Systems", filed on Oct. 26, 1993, the disclosure of which is expressly incorporated here by reference.

BACKGROUND

The present invention generally relates to radiocommunication systems and methods for signalling in radiocommunication systems and, more particularly, to systems and methods for communicating short text messages in radiocommunication systems.

The GSM describes a European standard for radiocommunication and the corresponding Public Land Mobile Network (PLMN) which is intended to provide uniformity so that users can access radiocommunication systems throughout Europe with minimal equipment compatibility problems. The GSM includes many services for subscribers, including a message function service called the Short Message Service (SMS) which provides for the transmission of messages having up to 160 alphanumeric characters to be sent to a subscriber at his or her mobile unit.

Unlike voice or data connections supported in radiocommunication systems, SMS messages are typically transmitted as overhead signalling, e.g., as part of the information provided on control channels. Thus, SMS service is more similar in many ways to conventional paging functions, but also has several differences. For example, if a phone is switched off, or otherwise unreachable, the SMS message is stored and can later be sent to the designated subscriber when that subscriber is reconnected to the system. The SMS message originates from either a mobile unit, which transmits the SMS message to a service center, or from a user external to the radiocommunication system, e.g., by calling an operator at a service center who enters the SMS message into the radiocommunication system.

When an SMS message is delivered from a service center to a mobile unit, regardless of how it originates, such a message is conventionally referred to as a "mobile terminated short message" (MTSM). If an SMS message originates at a mobile unit, the signal to the service center requesting forwarding of the SMS message is conventionally referred to as a "mobile originated short message" (MOSM). The conventional protocol for transmission of MTSMs is well established in the GSM, for example in the document entitled "GSM 09.02-Version 2" published in June 1992 which is incorporated here by reference and is described in more detail below with respect to FIG. 1.

Therein, an originating mobile station (MS-A) 2 sends an MOSM to the mobile switching center (MSC) 4 supporting the geographical area which the mobile station is currently visiting. Not shown explicitly in FIG. 1, but as will be apparent to those skilled in the art, is the base station which receives the signal from the mobile station 2 and forwards same to the MSC 4. The MSC 4 forwards the MOSM to interworking mobile switching center (IWMSC) 6 using an address of the service center assigned to mobile station 2 as part of the overhead information associated with the MOSM.

The IWMSC provides centralized interfacing functionality for SMS messaging. For MOSMs, the IWMSC 6 operates to transfer short messages to an identified service center (SC). The IWMSC also functions to transfer results associated with SMS message transmission back to the MSC. Thus, in this example, IWMSC 6 forwards the MOSM to SC-A 8. SC-A 8 acknowledges receipt of the MOSM back to IWMSC 6, which in turn forwards an acknowledgement back to MSC 4.

Service centers are "store and forward" devices which are logically outside of the mobile radio network. SCs operate to receive and store SMS messages, deliver SMS messages to mobile stations (or receivers outside of the mobile network) and, optionally, customize delivery of SMS messages according to service profiles stored at the SC. In the current example, SC-A 8 receives the MOSM from the IWMSC 6 and, assuming for the sake of this example that the subscriber associated with MS-A has a service profile stored at SC-A 8, performs one or more operations to the MOSM in accordance with the service profile. These operations may include, for example, copying the received SMS message and storing same, sending the SMS message according to a distribution list defined by subscriber A, or converting the SMS message to a desired delivery media (e.g., a fax). After performing whatever operations are indicated by the service profile, SC-A 8 then sends the MOSM as an MTSM to the recipient identified in the MOSM. This occurs as follows.

The MTSM is first sent to an SMS-gateway mobile switching center (GMSC) 10. Like its counterpart the IWMSC, the GMSC acts as a port into the mobile radio network. Before the GMSC 10 can deliver the SMS message through the chain of nodes to the base station (not shown) which is serving the recipient's mobile station, the GMSC 10 must first determine the location of the recipient's mobile station (i.e., which MSC is currently serving that mobile station). Thus, GMSC 10 first interrogates the recipient's home location register (HLR) 12 to obtain routing information for the message.

HLRs store data relating to subscribers including, for example, current location of the subscribers' equipment, directory number (MSISDN), radio number plan identification (e.g., International Mobile Subscriber Identity (IMSI)), supplementary service profiles and teleservice profiles. For MTSMs, HLRs provide (upon request) the identity of the visited MSC associated with a recipient of the SMS message, as well as information relating to whether the mobile station can receive the message (e.g., whether the subscriber is barred from receiving MTSMs). In the current example, to interrogate the HLR 12, a GSM MAP message called "Send Routing Information for Short Message" is sent by the GMSC 10 to the HLR 12. The appropriate HLR for interrogation can be determined using the recipient's MSISDN, e.g., by translating the MSISDN into a CCITT No. 7 address.

After receiving the routing information, e.g., the visited MSC number and IMSI, from HLR 12, the GMSC 10 forwards the message to the visited MSC/VLR 14 which is currently serving the recipient's mobile station MS-B 16. Note that for purposes of simplicity the visitor location register (VLR) has been illustrated in FIG. 1 as being integrated with the mobile switching center, although in practice these two nodes can be physically separated. The VLR manages data associated with subscribers which are currently situated within its area of responsibility, e.g., those which have roamed into the service area of that VLR, the VLR being updated with information from a subscriber's home location register. With respect to handling SMS messages, the VLR also stores an indication if a mobile station is unreachable for delivery of a particular MTSM. The VLR notifies the HLR when a mobile station can later be reached to deliver the MTSM.

The message is thus delivered to the MS-B 16 via a base station (not shown) over the air interface. Acknowledgement signals are then transmitted back through the chain of nodes.

From the foregoing, it is apparent that conventional techniques for delivering SMS messages provide only an opportunity for customization according to the message originator's preferences. However, for various reasons discussed below, it would be desirable to allow for the recipient's and/or a service provider's preferences to be taken into account when delivering SMS messages.

SUMMARY

These and other drawbacks and difficulties found in conventional radio communication systems, for example the GSM system, are overcome according to the present invention. According to exemplary embodiments of the present invention, messages which originate at a mobile station are routed through both an originator's and a recipient's service center to take advantage of the information stored at both centers.

Routing the message through an originator's service center has, for example, an advantage that the originator of the message can design his or her personal message service, e.g., distribution lists, storing copies of messages before they are sent, etc. Moreover, the originator's mobile unit will append the address of the originator's service center which is stored in the mobile or the originator's SIM card to the signal so that the originator need not enter a service center address for the message.

Routing the message through the recipient's service center, on the other hand, has the advantage that the recipient's preferences and current availability status can be taken into account when transmitting the message to the recipient's mobile unit. To enable such routing, the address of the recipient's service center must be obtained. Thus, techniques according to the present invention are described to enable identification and interrogation of a recipient's service center, in addition to the originator's service center.

According to the conventional systems and methods, the originating subscriber will have to know and specify not only the MSISDN number of the recipient, but also his or her service center address (or call an operator in his own service center, who may or may not know this address). According to the present invention this address can be stored in the HLR, so that the originator need not know this information.

Other advantages and features are also available for SMS message routing according to the present invention. Preferences set by MTSM recipients may include media conversion, scheduled delivery of SMS messages, copying and distribution of received SMS messages and storage of SMS messages. Moreover, users could restrict the types of SMS messages which they actually want delivered, e.g., to screen out annoying advertisements. This could be accomplished by providing a list in their service center which identifies those PLMNs or service centers from which received MTSMs should not be delivered.

Similar capabilities would also be available for the service provider, i.e., the system operator. Since the recipient's service center is part of the delivery route according to the present invention, the service provider would also have the opportunity to screen incoming MTSMs to prevent unwanted deliveries of SMS messages. Moreover, for security purposes, the service provider would also then have the capability to monitor the recipient and contents of SMS messages.

Thus, according to the present invention, message routing receives the advantages that are obtained when a message is routed via the originator's service center as well as via the recipient's service center. Further, exemplary embodiments also describe an interface protocol between the recipient's home location register and the recipient's service center to selectively provide profile information which can be used for routing messages.

BRIEF DESCRIPTION OF THE DRAWINGS

The foregoing objects, features and advantages of the present invention will be more readily understood upon reading the following detailed description in conjunction with the drawings in which.

DETAILED DESCRIPTION

Figure 1:
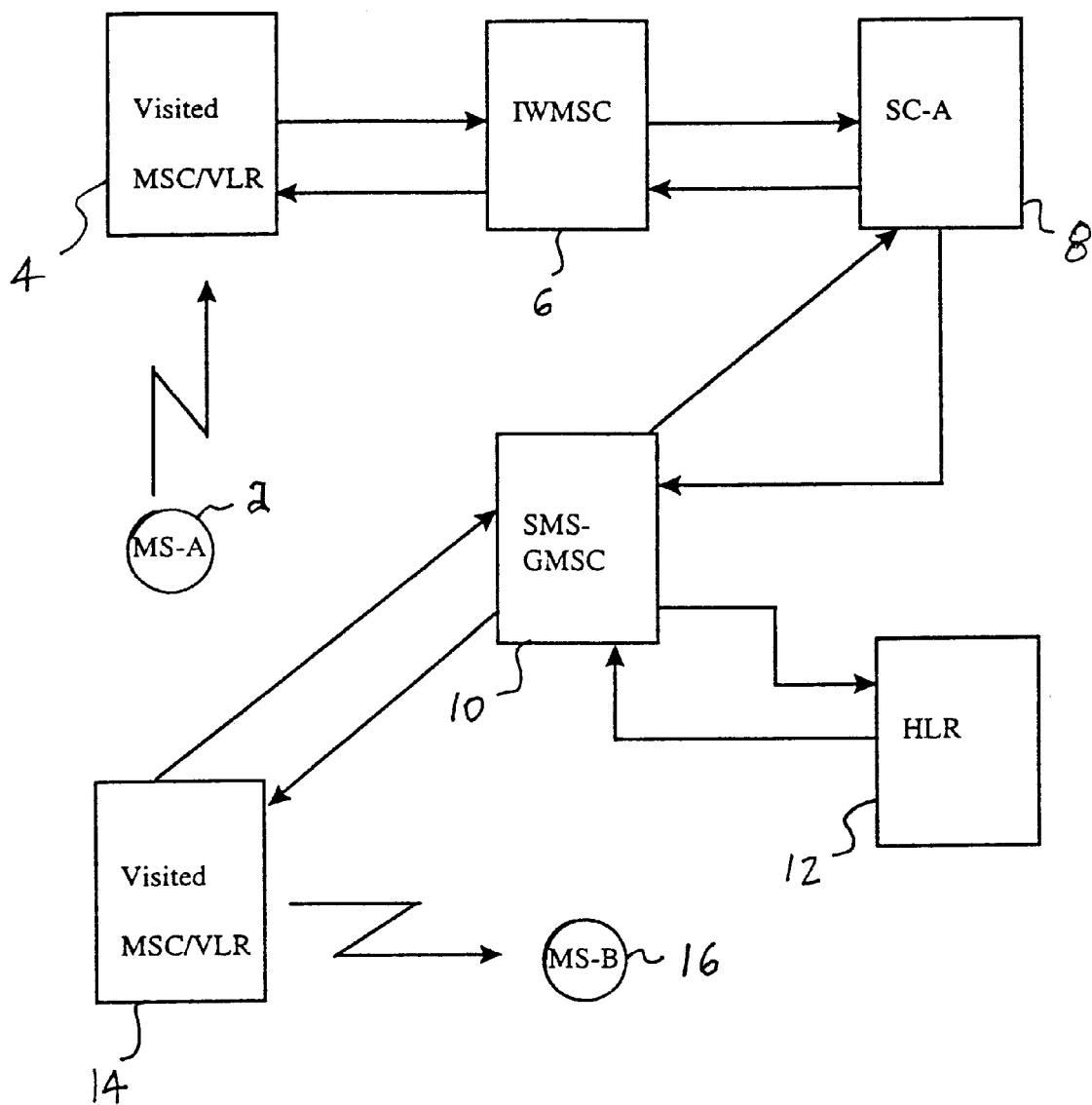
FIG. 1 illustrates a block diagram of entities involved in the conventional routing of SMS messages.
Figure 2:
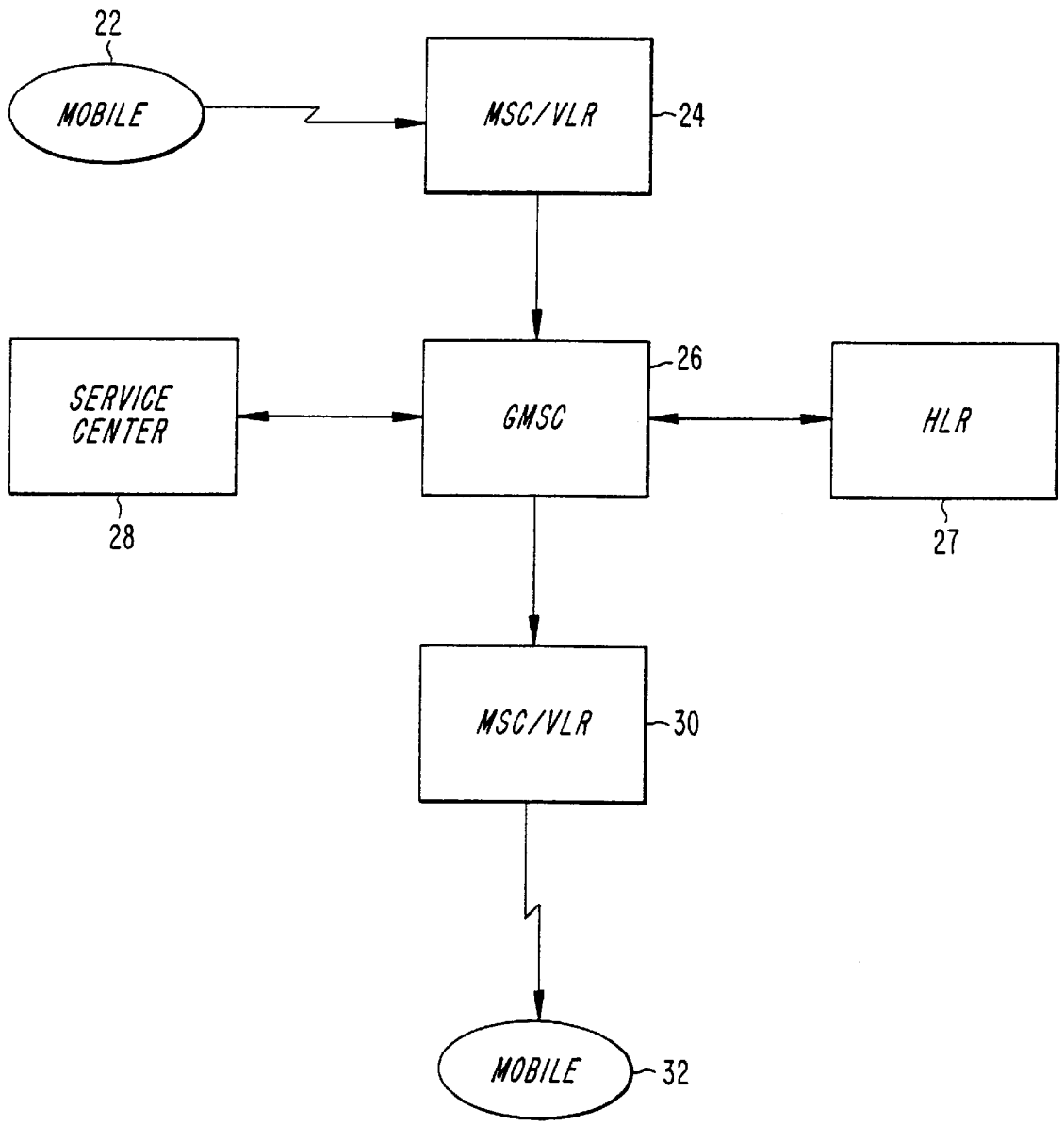
FIG. 2 illustrates a node map used to describe the routing of messages which originate at a mobile station but pass through only a recipient's service center according to a first exemplary embodiment of the present invention.

To illustrate the drawbacks associated with a procedure where messages are routed through only one of the service centers, routing through the recipient's service center will now be described with respect to FIG. 2. A message originates at mobile 22 and is transmitted to that mobile station's servicing MSC/VLR 24. As mentioned above, with respect to FIG. 1, the VLR can be physically separated from the MSC. The service center address received from the mobile unit is translated into routing information and the message is forwarded to the IWMSC/GMSC 26. Note that for simplicity of the figure, the logically separated IWMSC and GMSC are represented by the same block. The IWMSC/GMSC 26 then sends the message to the recipient's service center 28 based on information received from the originator's mobile equipment. Thereafter, the message is treated as an MTSM and sent through the IWMSC/GMSC 26 and MSC/VLR 30 to the recipient's mobile unit 32.

Thus, according to this routing method, MOSMs are routed through the recipient's service center but not through the originator's service center. However, this approach has, among other drawbacks, the drawback that information must be input by the originator to identify both the recipient and the recipient's service center and that message routing preferences of the originator cannot be taken into account in forwarding the message. Analogously, if the message were routed through only the originator's service center, the recipient's message routing preferences would not be taken into account.

Figure 3:
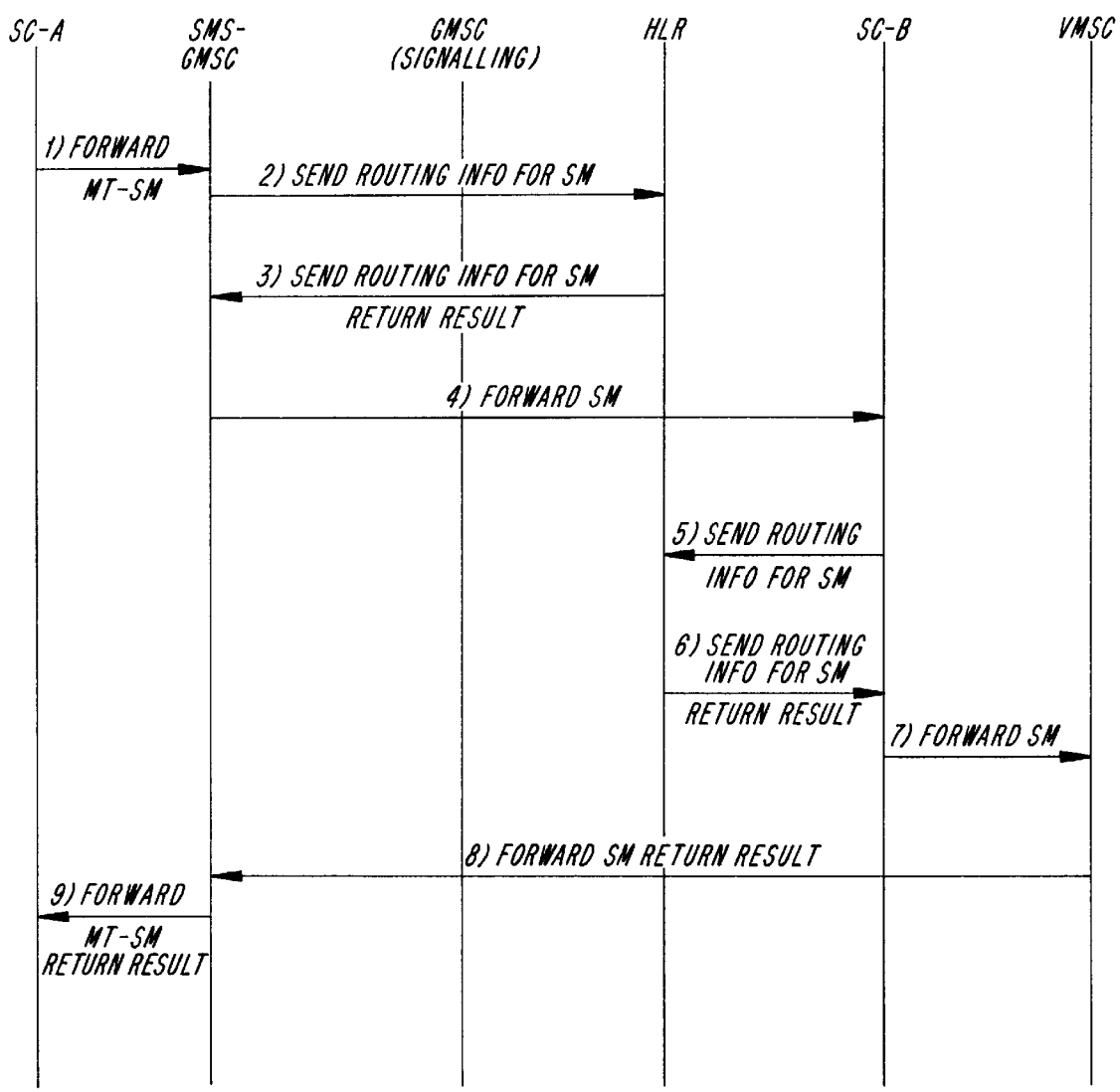
FIG. 3 shows a node map for routing messages according to an exemplary embodiment of the present invention.

According to another exemplary embodiment of the present invention illustrated in FIG. 3, a mobile originated message can pass through both an originator's service center and an intended recipient's service center. For convenience of illustration, FIG. 3 illustrates the nodes as vertical lines with arrows therebetween to indicate the signalling described below.

As in the previously described examples, an SMS message is first transmitted from an originator's mobile unit to a base station and passed on to the MSC/VLR in a conventional manner, thus this signalling is not illustrated in FIG.

3. If the service center address of the originator is stored in the subscriber's equipment, the message can be transmitted to the originator's service center (SC-A) and the originator need only input an identifier of the recipient, e.g., by dialing the recipient's number. The address of the originator's service center can be stored, for example, in the mobile or in a smart card which is removably attached to the mobile, and appended automatically to the transmission from the mobile.

FIG. 3 begins at the point where the message has been forwarded to the originator's service center SC-A. Therein, the SMS message can be processed in accordance with the originator's message subscriber profile, if any, which is stored in the service center.

As a first step, the message is then forwarded as an MTSM to an SMS-GMSC connected to the service center. Next, to route the message to the appropriate location/node that is currently serving the recipient's mobile, the SMS-GMSC will interrogate the recipient's home location register to retrieve routing information. Note that the second signalling step (and some subsequent steps) in FIG. 3 are illustrated as passing through a signalling GMSC, which refers to the case where the recipient's mobile station is associated with another PLMN. In this example, the HLR has the recipient marked as a subscriber to enhanced messaging services, e.g., by setting an enhanced messaging services indicator (EMSI) flag for this recipient. This means that, according to this exemplary embodiment of the present invention, the MTSM shall be passed to the service center of the recipient (SC-B) before delivery to the recipient.

Thus, when the HLR is interrogated at step 2 in FIG. 3, e.g., by sending a MAP operation "Send Routing Information For SM", the HLR checks the EMSI for that particular subscriber to see whether the recipient's service center (SC-B) shall be interfaced or not. In this case, at step 3, the HLR passes the address of SC-B back to the SMS-GMSC instead of the MSC number associated with a current location of the recipient's mobile unit.

The SMS-GMSC then forwards the MTSM to SC-B as illustrated by signal 4. If the subscriber profile stored in SC-B indicates that the MTSM procedure should be used to send the message to the subscriber, the SC-B signals the HLR to receive routing information, i.e., the address of the visited MSC associated with the recipient's mobile station. This is shown as signal 5. In order to distinguish between the first request for routing information to the HLR (signal 2) and the current request, SC-B can include a field in the signal that indicates that EMSI is suppressed, i.e., telling the HLR not to return a service center address but to instead return an address of the visited MSC.

Thus, at signal 6, the HLR returns routing information indicating the visited MSC (VMSC) which services the area where the recipient's mobile is currently located to SC-B, and the message is delivered as an MTSM to the VMSC (signal 7) as described above. This delivery may include the address of the originator's service center, i.e., SC-A, so that the VMSC can provide an appropriate delivery acknowledgement signal back to the SMS-GMSC, i.e., indicating the outcome of the delivery attempt, which in turn can be forwarded to the service center of the message originator (SC-A). Thus, should the SMS message fail to be delivered, e.g., if the recipient's mobile unit is powered off, SC-A will re-try delivery at an appropriate time. Alternatively, SC-B could be used as the calling address in which case SC-B would take over the responsibility to deliver the SMS message.

According to another exemplary embodiment of the present invention, the intelligence associated with the message routing decision making may be centralized rather than distributed among the service centers. That is, a central node, referred to herein as the "SCP", may be vested with the responsibility to determine how SMS messages received at service centers shall be routed. An example of message routing using this "network" solution is provided below wherein an MTSM is distributed to two recipients on the same media.

Figure 4:
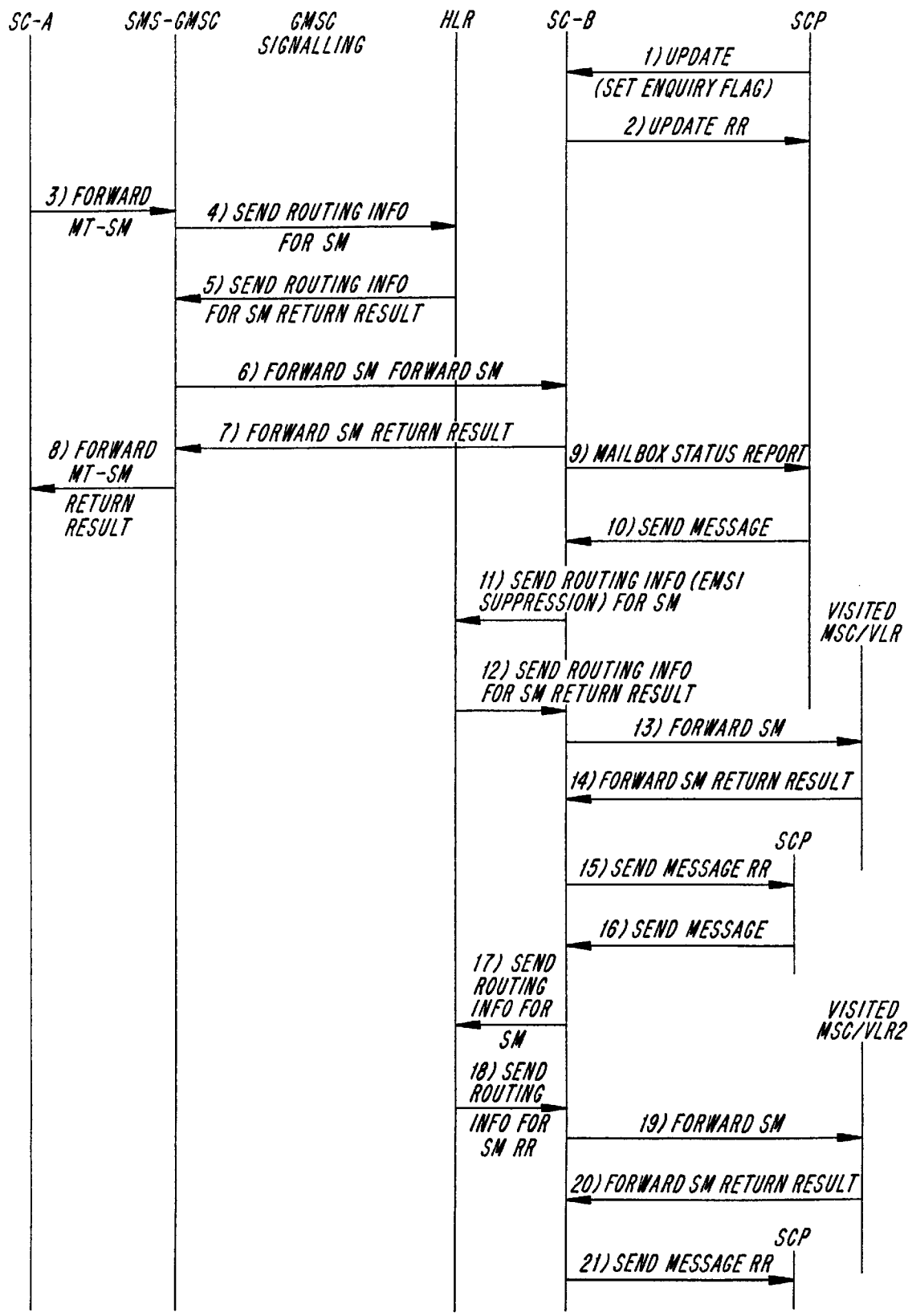
FIG. 4 shows a node map for routing messages according to another exemplary embodiment.

Referring to FIG. 4, the SCP first sets an enquiry flag in the service center SC-B (signal 1) indicating that the networked mode is in effect and that the SC-B should consult SCP if an MTSM is received. Otherwise, if this flag is not set, then SC-B would treat an incoming MTSM as described above with respect to FIG. 3. Signal 2 acknowledges the setting of the enquiry flag.

Signals 3–6 in FIG. 4 correspond to signals 1–4 described above with respect to the embodiment of FIG. 3, which description is incorporated here by reference. After receipt of the short message, SC-B notes that the enquiry flag is set. Although most of the routing decision making is vested in SCP in this exemplary embodiment, SC-B may still be responsible for screening unwanted short messages before querying SCP. The received MTSM is acknowledged back to the SMS-GMSC (signal 7) and thence to the originator's service center SC-A (signal 8).

Since the MTSM is not, in this exemplary scenario, screened (e.g., the message did not originate from a barred PLMN in the recipient's subscriber profile stored in SC-B), SC-B informs the SCP that an MTSM has been received by sending a mailbox status report (signal 9) to the SCP. The SCP then instructs the SC-B in the manner in which the MTSM should be delivered, in this example as a short message rather than being converted to some other media (signal 10). Since the SC-B is not concerned with the recipient's enhanced message service status, i.e., it only wishes the HLR to return the routing information to the visited MSC/VLR, the SC-B sets the EMSI suppression flag as part of its request for routing information for the SMS message from the HLR (signal 11).

Upon receiving the MSC number (signal 12) from the HLR, SC-B forwards the SMS message to the visited MSC/VLR (signal 13), which receipt is acknowledged by the visited MSC/VLR (signal 14). Next, SC-B informs the node SCP about the delivery outcome of the MTSM (signal 15). The SCP then orders the SC-B to send another copy of the MTSM, e.g., because the recipient's subscriber profile indicates that a copy of received short messages should be routed to another party, via signal 16 in which it provides an identity associated with the second recipient. Although this exemplary embodiment of the present invention describes serial delivery of an SMS message to multiple recipients, those skilled in the art will appreciate that delivery could also be performed in parallel.

The SC-B again requests routing information from the HLR, at signal 17, but this time without suppressing EMSI, since the second recipient may also subscribe to the enhanced messaging service. If the second recipient does subscribe to the enhanced messaging service, then the address of the recipient's service center is returned and signalling analogous to that of signals 6–13 in FIG. 4 would be performed. Otherwise, as illustrated in FIG. 4, the HLR will return the MSC number for the visited MSC/VLR (signal 18) and the message will be forwarded as described above using signals 19–21. Note that more than one SCP may be involved in routing messages, e.g., across different networks.

While the present invention has been described using the foregoing exemplary embodiments, these embodiments are intended to be illustrative in all respects, rather than restrictive of the present invention. For example, although the term "mobile" has been used throughout this specification, the present invention can be applied to systems and methods wherein any type of remote equipment which supports the message service is originating or receiving the message, e.g., a portable unit, a personal digital assistant, a data terminal, etc.

Moreover, although the foregoing exemplary embodiments refer to messages which originate at "mobiles", those skilled in the art will also recognize that the present invention can also be applied where other types of equipment originate the message, e.g., PSTNs or data networks. Further, although the present invention has been exemplified by embodiments which refer to the GSM, the present invention is equally applicable to any system or standard (e.g., PDC or ADC) wherein messages may be routed using methods or systems that include service centers or analogous equipment. Thus, the scope of the present invention is instead set forth by the appended claims and encompasses any and all equivalents and modifications embraced thereby.

What is claimed is:

1. A method for delivering a message in a radiocommunication network comprising the steps of:
   sending the message to an originator's service center which handles messages that are transmitted by the originator;
   requesting routing information from a home location register associated with a recipient of said message;
   returning from said home location register,
      first routing information if said recipient has subscribed to an enhanced message routing service and
      second routing information if said recipient has not subscribed to said enhanced message routing service;
   routing said message to a recipient's service center if said first routing information is returned, otherwise routing said message to a mobile switching center currently supporting said recipient's equipment if said second routing information is returned; and
   delivering said message to said recipient's equipment.

2. The method of claim 1, further comprising the step of:
   modifying, if said message is routed to said recipient's service center, delivery of said message according to a recipient's subscriber profile stored in said recipient's service center.

3. The method of claim 2, wherein said step of modifying further comprises the step of:
   screening said message if said message originated from a PLMN identified in said recipient's subscriber profile.

4. The method of claim 2, wherein said step of modifying further comprises the step of:
   translating said message into another medium.

5. The method of claim 4, wherein said message is originally an SMS message and said another medium is facsimile.

6. The method of claim 2, wherein said step of modifying further comprises the step of:
   distributing said message to other recipients.

7. The method of claim 2, wherein said step of modifying further comprises the step of:
   storing said message prior to delivery.

8. The method of claim 1, wherein said first routing information is an address of said recipient's service center.

9. The method of claim 1, wherein said routing information is a mobile switching center number.

10. The method of claim 1, further comprising the steps of:
    if said message is routed to said recipient's service center, again requesting routing information from said home location register and suppressing a return of information relating to said recipient's service center.

11. The method of claim 10, wherein said step of suppressing further comprises the step of:
    setting an enhanced message service suppression flag in said request.

12. The method of claim 1, wherein said recipient's equipment includes a facsimile machine.

13. The method of claim 1, further comprising the steps of:
    sending a message, from said recipient's service center to a supervisory network node, informing said supervisory network node that said message has been received;
    returning instructions, from said supervisory network node to said recipient's service center, regarding the manner of delivery of said message; and
    wherein said step of delivering said message is performed according to said instructions regarding the manner of delivery of said message.

14. The method of claim 13, wherein said supervisory network node stores a recipient subscriber profile and said manner of delivery is defined by said subscriber profile.

15. The method of claim 14, further comprising the step of:
    ordering, from said supervisory network node to said recipient's service center, the delivery of another copy of said message if said subscriber profile so indicates.

16. A method for obtaining routing information from a home location register in a radiocommunication system comprising the steps of:
    signalling, to said home location register, a request for routing information pertaining to a subscriber associated with said home location register;
    determining, in said home location register, whether said subscriber has subscribed to an enhanced message routing service; and
    signalling, to an entity which requested said routing information, information indicating either a service center address associated with said subscriber if said subscriber has subscribed to said enhanced message routing service or an equipment address associated with equipment which is currently providing radiocommunication service to said subscriber if said subscriber has not subscribed to said enhanced message routing service.

17. The method of claim 16, wherein said equipment address is a mobile switching center address.

18. The method of claim 16, further comprising the step of:
    setting an enhanced message service suppression flag in said request for routing information, wherein said step of signaling to said entity which requested said routing information returns said equipment address in response to said enhance message service suppression flag.

19. A terminal comprising:
    a processor for performing data processing tasks including preparation of SMS messages;
    a transmitter for transmitting information, including said SMS messages;

input means for inputting a recipient identifier; and a memory device for storing information, including a service center address associated with said terminal, wherein said processor retrieves said service center address from said memory device and includes said service center address and the recipient identifier in said SMS messages.

20. A system for communicating short text messages between a message originator and a message recipient in a radiocommunication system comprising:

a first service center associated with said originator which stores subscriber profile information associated with said originator;

a second service center associated with said recipient which stores subscriber profile information associated with said recipient;

a home location register for providing first routing information and subscriber service information; and a mobile switching center for obtaining said first routing information from said home location register and selectively using said first routing information to route said short text message from said first service center to said second service center based on said subscriber service information.

21. The system of claim 20, further comprising:

a supervisory network node which is alerted by said second service center to receipt of said short text message and which instructs said second service center regarding forwarding of said short text message to said recipient's equipment.

22. The system of claim 21, wherein, upon receipt of said instructions from said supervisory network node, said second service center requests second routing information from said home location register, while suppressing the return by said second service center of said subscriber service information, so that said home location register can only return routing information to said recipient's equipment.

23. The system of claim 21, wherein said recipient's equipment is a facsimile machine.

24. A method for delivery of a message in a radiocommunication network comprising the steps of:

receiving the message at a service center;

informing a supervisory network node that said message has been received;

signaling, from said supervisory network node to said service center, instructions concerning the manner of delivering said message; and requesting, from said service center to a home location register, routing information pertaining to a subscriber associated with said home location register;

delivering said message in accordance with said manner of delivery and said routing information.

25. The method of claim 24, wherein said request for routing information contains an enhanced message service suppression flag.

26. The method of claim 24, further comprising the steps of:

informing said supervisory network node regarding an outcome of said step of delivering; and returning, from said supervisory network node to said service center, orders for said service center to send another copy of said message to another recipient.

27. The method of claim 26, further comprising the steps of:

signaling, from said service center to said home location register, a request for routing information pertaining to a subscriber associated with said home location register;

returning from said home location register,
first routing information if said subscriber has subscribed to an enhanced message routing service; and
second routing information if said subscriber has not subscribed to said enhanced message routing service;

routing said another copy of said message to a subscriber's service center if said first routing information is returned, otherwise routing said another copy of said message to a mobile switching center currently supporting said subscriber's equipment if said second routing information is returned; and delivering said another copy of said message to said subscriber's equipment.

* * * * *